(12) United States Patent
Heidenfelder et al.

(10) Patent No.: US 9,487,845 B2
(45) Date of Patent: Nov. 8, 2016

(54) PROCESS FOR THE ACID DIGESTION OF METAL-CONTAINING COMPOUNDS

(75) Inventors: Thomas Heidenfelder, Dannstadt-Schauernheim (DE); Helmut Witteler, Wachenheim (DE); Bernd Laubusch, Bürstadt (DE); Hans-Peter Seelmann-Eggebert, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 5 days.

(21) Appl. No.: 13/106,281

(22) Filed: May 12, 2011

(65) Prior Publication Data

US 2011/0217222 A1    Sep. 8, 2011

Related U.S. Application Data

(63) Continuation of application No. 12/281,217, filed as application No. PCT/EP2007/051899 on Feb. 28, 2007, now abandoned.

(30) Foreign Application Priority Data

Mar. 1, 2006  (EP) .................... 06110545

(51) Int. Cl.
| | | |
|---|---|---|
| *C22B 15/00* | (2006.01) | |
| *C22B 3/08* | (2006.01) | |
| *C22B 3/16* | (2006.01) | |
| *C22B 7/00* | (2006.01) | |
| *C22B 3/34* | (2006.01) | |
| *C22B 3/00* | (2006.01) | |
| *C22B 59/00* | (2006.01) | |

(52) U.S. Cl.
CPC ............. *C22B 15/0071* (2013.01); *C22B 3/08* (2013.01); *C22B 3/165* (2013.01); *C22B 7/007* (2013.01); *C22B 3/0031* (2013.01); *C22B 19/22* (2013.01); *C22B 59/00* (2013.01); *Y02P 10/234* (2015.11); *Y02P 10/236* (2015.11)

(58) Field of Classification Search
CPC ......... C25C 1/00; B27K 3/005; C22B 7/007; C22B 15/0071; C22B 3/08
USPC .............................................. 75/743
See application file for complete search history.

(56) References Cited

U.S. PATENT DOCUMENTS

| | | | |
|---|---|---|---|
| 3,471,252 A | | 10/1969 | Sugahara et al. |
| 3,725,296 A | | 4/1973 | Thom |
| 4,120,935 A | | 10/1978 | Fountain et al. |
| 5,207,996 A | * | 5/1993 | Sierakowski et al. .......... 423/27 |
| 5,660,806 A | * | 8/1997 | Fristad et al. .................. 423/98 |
| 2008/0025890 A1 | | 1/2008 | Seelmann-Eggebert et al. |

FOREIGN PATENT DOCUMENTS

| | | |
|---|---|---|
| DE | 146756 | 3/1981 |
| DE | 10 2004 063 500 A1 | 7/2006 |
| EP | 0536914 A1 | 4/1993 |
| EP | 0690024 A2 | 1/1996 |
| EP | 1050604 A1 | 11/2000 |

* cited by examiner

*Primary Examiner* — Weiping Zhu
(74) *Attorney, Agent, or Firm* — Drinker Biddle & Reath LLP

(57) ABSTRACT

Aqueous leachant compositions and processes for using the same comprising: (a) providing a metal-containing compound; and (b) subjecting the metal-containing compound to an acid digestion comprising contacting the metal-containing compound with an aqueous leachant; wherein the aqueous leachant comprises a mixture selected from the group consisting of: (i) sulfuric acid and one or more alkanesulfonic acids having alkane moieties selected from the group consisting of propyl, ethyl and methyl groups, at a weight ratio of alkanesulfonic acid to sulfuric acid of 1:1000 to 1:1; (ii) sulfuric acid and one or more salts of alkanesulfonic acids having alkane moieties selected from the group consisting of propyl, ethyl and methyl groups, at a weight ratio of salt of alkanesulfonic acid to sulfuric acid of 1:9 to 1:99.

16 Claims, No Drawings

PROCESS FOR THE ACID DIGESTION OF METAL-CONTAINING COMPOUNDS

CROSS-REFERENCE TO RELATED APPLICATIONS

This application is a continuation of U.S. patent application Ser. No. 12/281,217, filed Aug. 29, 2008, which was a national stage application, under 35 U.S.C. §371, of PCT/EP2007/051899, filed Feb. 28, 2007, which claimed priority of European Patent Application No. 06110545.8, filed Mar. 1, 2006.

BACKGROUND OF THE INVENTION

Very few metals occur in pure form in nature. They are usually present cationically as oxides, sulfides, arsenides, halides, carbonates, phosphonates, sulfates, etc. They occur as metal-comprising minerals or mineral mixtures which are more or less conglomerated with rock and if of economic importance are referred to as ores.

To isolate the pure elements, the minerals and ores have to be processed and the metals extracted therefrom. One possibility is the "leaching process" in which the metal ions are extracted directly from the ore by means of acidic or basic aqueous solutions. The leachant used depends on the type of ore and the occurrence in the respective deposit. In many cases, dilute sulfuric acid (from 1 to 5% by weight) has been found to be useful.

This process can be applied successfully to, for example, low-copper ores and waste products which have a copper content of less than 2% by weight, for example the copper-comprising residues obtained in the burning of pyrite in sulfuric acid manufacture. These starting materials are, if necessary after prior roasting, treated with dilute sulfuric acid and the copper is isolated from the resulting copper sulfate solution by means of further work-up steps.

The usual way of extracting the copper is to make a heap of the copper-comprising material and then spray it from above with dilute sulfuric, so that the dilute sulfuric acid can percolate or trickle through the copper-comprising material. The copper-enriched mother liquor collects at the bottom of the heap and is passed to further work-up.

However, the dilute sulfuric acid has to act on the copper for a period of up to a number of weeks in order to dissolve satisfactory amounts of metal ions from the ore. In general, the yields in copper winning by this process are low.

A process for the acid digestion of copper ores having a low copper content is described in U.S. Pat. No. 4,120,935. Here, the copper ore is wetted with concentrated sulfuric acid and is left for at least 3 days before the ore is washed with from 5 to 10 times the amount of low-concentration sulfuric acid.

German application DE 10 2004 063 500.5 describes the addition of surfactants to the dilute sulfuric acid to increase the yield. The surfactants are selected so that in a concentration of from 0.01 to 0.3% by weight in a 2% strength aqueous $H_2SO_4$ solution at 23° C. they lead to a reduction in the contact angle on glass by at least 10° after 1 second.

EP 0 536 914 describes the use of fluoroaliphatic surfactants of the general formula $(Rf)_n(Q)_xZ$, where Rf is a fluoroaliphatic radical, Q is a linking unit and Z is a water-soluble group, in the extraction of copper (n=1 or 2 and x=0 or 1) by means of an aqueous leachant comprising sulfuric acid.

However, disadvantages of these known processes are the large amounts of sulfuric acid which are acquired to separate the copper from the copper-comprising materials and also the generally unsatisfactory yield of copper during the extraction, which is usually not more than 80%. Furthermore, the extraction takes up a considerable time ranging from a few days to a few months.

BRIEF SUMMARY OF THE INVENTION

The present invention relates to a process for the acid digestion of metal-comprising compounds by leaching by means of an aqueous leachant, wherein the aqueous leachant comprises i) an alkanesulfonic acid and, if appropriate, sulfuric acid and/or ii) a mixture of one or more salts of alkanesulfonc acid. Furthermore, an aqueous leachant comprising one or more alkanesulfonic acids and, if appropriate, sulfuric acid and/or surfactant as well as an aqueous leachant containing one or more salts of alkanesulfonic acids, sulfuric acid and, if appropriate, surfactant is provided by the present invention.

The process of the invention is suitable, for example, for the winning of copper, for the production of $TiO_2$ or for the digestion of fluorspar ($CaF_2$) to produce hydrogen fluoride.

It is an object of the present invention to provide an alternative process for the acid digestion of metal-comprising compounds by means of an aqueous leachant. Among other things, an increased yield of metal ions, based on the metal-comprising compound used, compared to the above-described processes should be achieved.

The object is achieved by a process for the acid digestion of metal-comprising compounds by leaching by means of an aqueous leachant, wherein the leachant i) comprises one or more alkanesulfonic acids and/or ii) a mixture of one or more salts of alkanesulfonic acids and sulfuric acid. In a further embodiment, the leachant comprises in case of i) one or more alkanesulfonic acids and also sulfuric acid.

An advantage of the process of the invention is that the extraction of metal-comprising compounds by means of an aqueous solution comprising alkanesulfonic acid and sulfuric acid and/or a mixture of salt of alkanesulfonic acid and sulfuric acid leads to significantly higher yields of metal ions than are found in extraction by means of aqueous sulfuric acid without addition of alkanesulfonic acid and/or salt of alkanesulfonic acid. The digestion can thus be carried out in a shorter time and/or using smaller amounts of leachant. A further advantage is the very wide applicability of the process of the invention. Thus, not only metals but also metal compounds such as $TiO_2$ can be produced, and, for example, $CaF_2$-comprising compounds can also be digested by the process of the invention to produce hydrofluoric acid. The use of salts of alkanesulfonic acids mixed with sulfuric acid furthermore has the advantage that salts of alkanesulfonic acids accumulating as waste products in other chemical processes can be used in a beneficial manner.

The process of the invention is in principle suitable for leaching any metal-comprising compounds in the case of which a metal can be dissolved from the respective compounds, for example ores, rock or minerals, by treatment with sulfuric acid. The metal-comprising compounds which can be digested by the present process are, for example, oxides, sulfides, arsenides, chlorides, carbonates, phosphates or fluorides.

DETAILED DESCRIPTION OF THE INVENTION

Copper-comprising oxidic ores include, for example, red copper ore (cuprite) $Cu_2O$, green malachite $Cu_2(OH)_2(CO_3)$ (="CuCO$_3$.Cu(OH)$_2$") and blue azurite Cu$_3$(OH)$_2$(CO$_3$)$_2$ (="2CuCo$_3$.Cu(OH)$_2$"), sulfidic copper ores include, for example, chalcopyrite CuFeS$_2$ (="Cu$_2$S.Fe$_2$S$_3$"), bornite Cu$_3$FeS$_3$ (="3Cu$_2$S.Fe$_2$S$_3$"), cubanite CuFe$_2$S$_3$ and copper glance (chalcosine) Cu$_2$S. Further metals which can be obtained from their ores by acid extraction are zinc, lead, molybdenum, antimony, bismuth, mercury, cobalt and nickel.

For the winning of zinc, the zinc ores (zinc blend, smithsonite) are roasted before leaching.

Lanthanum and the lanthanides can be obtained by the acid digestion of cerite, monazite, turnerite and orthite according to the invention.

Uranyl sulfate, which is processed further to obtain uranium, can be obtained from uranium ores by the process of the invention.

Preference is given to digesting metal-comprising compounds which comprise copper, titanium, CaF$_2$, zinc, lead, molybdenum, antimony, bismuth, mercury, cobalt, nickel, aluminum, lanthanum, lanthanides or uranium by the process of the invention.

The metal comprised in the metal-comprising compound can be present in any oxidation state which is possible for the respective metal.

Leaching is frequently only an intermediate step in metal winning, in which the desired metal is dissolved from the rock and converted into a soluble form which is then subjected to further purification and work-up steps.

However, in some cases the pure metal is not the desired end product. For example, titanium minerals such as ilmenite (FeTiO$_3$) are digested for the production of TiO$_2$, bauxite is digested for the production of alum or aluminum hydroxide is digested for the production of aluminum sulfate.

It is possible to use not only freshly mined ores and minerals but also waste products or intermediates from other processes, e.g. the copper-comprising residues obtained in the burning of pyrite in sulfuric acid manufacture or filter dust or fly ash obtained in the cleaning of exhaust air, for recovering the heavy metals comprised therein by means of the process of the invention.

The objective of the process is not always the extraction of the cation comprised in the mineral or in the ore but may instead be the extraction of the counterion. For example, the digestion of fluorspar (CaF$_2$) is utilized for producing hydrogen fluoride or the digestion of apatite Ca$_5$(PO$_4$)$_3$(F, OH, Cl) is employed for obtaining phosphoric acid. In these cases too, the metal-comprising compounds comprising the desired anion as counterion can be digested by the process of the invention.

The aqueous leachant used according to the process of the invention comprises i) from 0.001 to 50% by weight of one or more alkanesulfonic acids, preferably from 0.01 to 10% by weight. If appropriate, the alkanesulfonic acid can also have a concentration above 50% by weight. Preference is given to using one alkanesulfonic acid.

The aqueous leachant used according to the process of the invention comprises ii) from 1 to 10% by weight of one or more salts of alkanesulfonic acids, from 90 to 99% by weight of sulfuric acid and, if appropriate, 0 to 5% by weight of surfactant.

For the purposes of the present invention, it is possible to use cyclic, linear and branched alkanesulfonic acids whose alkyl radical has from 1 to 40 carbon atoms as alkanesulfonic acids. They can be prepared by methods known to those skilled in the art, for example by sulfoxidation of the corresponding alkanes. Preference is given to using alkanesulfonic acids having short-chain alkyl radicals such as propyl, ethyl or methyl radicals; particular preference is given to using methanesulfonic acid.

In a preferred embodiment, the aqueous leachant comprises both alkanesulfonic acid and sulfuric acid. The concentration of sulfuric acid is in the range from 0 to 50% by weight, preferably from 0 to 10% by weight.

In a preferred embodiment, the sulfuric acid used is dilute sulfuric acid having a content of from 1 to 80 g/l of H$_2$SO$_4$, particularly preferably from 2 to 60 g/l of H$_2$SO$_4$, in particular from 5 to 40 g/l of H$_2$SO$_4$.

According to the invention the ammonium, alkaline and alkaline earth salts of the alkane-sulfonic acids described precedingly are used as salts of alkanesulfonic acids. Preferred are the ammonium and the alkaline salts, especially preferred are ammonium and sodium salts of methanesulfonic acid, most preferred is the sodium salt of methanesulfonic acid (sodiummethanesulfonate).

The ratio of sulfuric acid to alkanesulfonic acid in the aqueous leachant according to the present invention is in the range from 1 000:1 to 1:1, preferably from 100:1 to 10:1.

According to the invention the ratio of salt of alkanesulfonic acid to sulfuric acid is in the range of 1:9 to 1:99. Mixtures of salt of alkanesulfonic acid and sulfuric acid typically contain 1 to 10% by weight of salt of alkane sulfonic acid and 90 to 99% by weight of sulfuric acid.

In the process of the invention, surfactants can be added to the aqueous leachant. The surfactants used can be anionic, cationic, nonionic or amphoteric. Mixtures of the above-mentioned classes of surfactants can also be used. Preference is given to surfactants which after extraction of the metal from the metal-comprising material do not interfere in the further work-up of the extracted metal in the sulfuric acid solution. Thus, for example, the transfer of copper from the aqueous extraction phase into an organic phase should not be adversely affected. Suitable surfactant systems therefore have to be good wetting agents but poor emulsifiers. In a preferred embodiment of the present invention, use is therefore made of a surfactant which during the extraction of the aqueous phase with an organic phase does not significantly increase the time for phase separation to occur compared to phase separation without surfactant.

Furthermore, suitable surfactants should preferably be stable under the acidic conditions caused by the alkanesulfonic acid and, if present, the sulfuric acid in an aqueous phase and preferably be biodegradable, particularly preferably readily biodegradable.

Particular preference is given to using surfactants which in a concentration of from 0.01 to 0.3% by weight, particularly preferably from 0.05 to 0.25% by weight, in particular from 0.1 to 0.2% by weight, in a 2% strength aqueous H$_2$SO$_4$ solution at 23° C. lead to a reduction in the contact angle on glass by at least 10°, particularly preferably at least 20°, in particular at least 30°, especially at least 40°, after 1 second, particularly preferably after 0.5 second, in particular after 0.1 second.

The surfactants described in the German application number DE 10 2004 063 500.5 are particularly useful. For example, the surfactant can be selected from the group of nonionic surfactants, preferably nonionic surfactants selected from the group consisting of alcohol alkoxylates, alkylphenol alkoxylates, alkylpolyglucosides, N-alkylpolyglucosides, N-alkylglucamides, fatty acid alkoxylates, fatty acid polyglycol esters, fatty acid amine alkoxylates, fatty acid amide alkoxylates, fatty acid alkanolamide alkoxylates, N-alkoxypolyhydroxyamides of fatty acids, N-aryloxypolyhydroxyamides of fatty acids, block copolymers of ethylene oxide, propylene oxide and/or butylene oxide, polyisobutene alkoxylates, polyisobutene-maleic anhydride derivatives, fatty acid glycerides, sorbitan esters, polyhydroxy fatty acid derivatives, polyalkoxy fatty acid derivatives and bisglycerides;

the group of anionic surfactants, preferably anionic surfactants selected from the group consisting of fatty alcohol sulfates, sulfated alkoxylated alcohols, alkanesulfonates, N-acylsarcosinates, alkylbenzenesulfonates, olefin sulfonates and disulfonates, alkyl ester sulfonates, sulfonated polycarboxylic acids, alkylglycerol sulfonates, fatty acid glycerol ester sulfonates, alkylphenol polyglycol ether sulfates, paraffin sulfonates, alkyl phosphates, acylisothionates, acyltaurates, acylmethyltaurates, alkylsuccinic acids, alkenylsuccinic acids or their monoesters or monoamides, alkylsulfonylsuccinic acids or their amides, monoesters and diesters of sulfonylsuccinic acids, sulfated alkyl polyglycosides, alkyl polyglycol carboxylates and hydroxyalkyl sarcosinates;

the group of cationic surfactants, preferably cationic surfactants selected from the group consisting of tetraalkylammonium salts, imidazolinium salts and amine oxides;

the group of amphoteric surfactants, preferably amphoteric surfactants selected from the group consisting of surfactants comprising carboxylic acids and additionally at least one ethylenically unsaturated monomer unit of the general formula (I)

$R^1(R^2)C=C(R^3)R^4$  (I), where $R^1$ to $R^4$ are each, independently of one another, —H, —CH$_3$, a straight-chain or branched saturated alkyl radical having from 2 to 12 carbon atoms, a straight-chain or branched, monounsaturated or polyunsaturated alkenyl radical having from 2 to 12 carbon atoms, alkyl or alkenyl radicals as defined above substituted by —NH$_2$, —OH or —COOH, a heteroatomic group having at least one positively charged group, a quaternized nitrogen atom or at least one amine group having a positive charge in the pH range from 2 to 11 or —COOH or —COOR$^5$, where $R^5$ is a saturated or unsaturated, straight-chain or branched hydrocarbon radical having from 1 to 12 carbon atoms.

Furthermore, it is possible, within the scope of the present invention, to use surfactants of different classes, for example anionic surfactants together with cationic surfactants, amphoteric surfactants together with nonionic surfactants, etc., in the composition according to the invention. Here, it is possible to use surfactants from 1, 2, 3 or 4 different classes of surfactant (nonionic, anionic, cationic and amphoteric).

It has also been found that very low concentrations of the surfactant systems described improve the kinetics of the extraction, increase the metal yield and make it possible to decrease the amount of alkanesulfonic acid and/or sulfuric acid used further.

In a preferred embodiment of the present invention, the resulting aqueous composition comprising the surfactant has a contact angle on glass of less than 40°, particularly preferably less than 30°, in particular less than 20°.

The contact angle is measured on an extra-white glass microscope slide from Gerhard Menzel Glasbearbeitungswerk GmbH & Co. KG, Braunschweig, having a thickness of 1 mm. The approximate composition of the glass microscope slide is as follows:

Approximate Chemical Composition:

| Silicon dioxide | SiO$_2$ | 72.20% |
| Sodium oxide | Na$_2$O | 14.30% |
| Potassium oxide | K$_2$O | 1.20% |
| Calcium oxide | CaO | 6.40% |
| Magnesium oxide | MgO | 4.30% |
| Aluminum oxide | Al$_2$O$_3$ | 1.20% |
| Iron oxide | Fe$_2$O$_3$ | 0.03% |
| Sulfur trioxide | SO$_3$ | 0.30% |

Further Properties of the Glass are as Follows:

| Mean expansion coefficient (20-300°) | 90.6 × 10$^{-7}$/C.° |
| Elongation point log n 14.5 | 513° C. |
| Littleton softening point | 720° C. |

Radiation from Second Mirror Surface:
Total solar reflection (M=2) as a proportion of the normal reflection at a second mirror surface at a solar elevation of 30°: 95.3%

Light Transparency:
Total solar transparency (M=2) as a proportion of the normal transparency at a solar elevation of 30° C.: 91.6%

Optical Index of Refraction

| At λ = 546.07 nm | 1.5171 |
| Density | 2.479 |

The glass microscope slide is cleaned with acetone and dried at 70° C. for 2 hours in a drying oven before measurement of the contact angle.

The amount of nonionic surfactant employed is, on the basis of experience, from 1 to 30 ppm, preferably from 1 to 20 ppm, particularly preferably from 2 to 15 ppm, in particular from 3 to 10 ppm, per metric ton of starting material. It has been found to be advantageous to use a higher concentration at the beginning of the extraction process than toward the end of the extraction.

The present invention further provides an aqueous leachant comprising
a) 0.001-50% by weight of one or more alkanesulfonic acids,
b) 0.1-50% by weight of sulfuric acid and
c) 0-5% by weight of one or more anionic, nonionic, cationic or amphoteric surfactants,
with the water present and the sum of the components a) to c) adding up to 100% by weight.

The present invention also provides an aqueous leachant comprising
a) 1-10% by weight of one or more salts of alkanesulfonic acids,
b) 90-99% by weight of sulfuric acid and
c) 0-5% by weight of one or more anionic, nonionic, cationic or amphoteric surfactants,
with the water present and the sum of the components a) to c) adding up to 100% by weight.

In a further embodiment of the present invention the aqueous leachant may contain alkanesulfonic acid, salt of alkanesulfonic acid and sulfuric acid.

Leaching processes for the digestion of metal-comprising compounds are known in principle to those skilled in the art.

Leaching by the process of the invention of the metal-comprising compounds to be digested preferably means that the metal-comprising, if appropriate previously comminuted compounds are made into a heap and the aqueous leachant, i.e. the aqueous solution comprising alkanesulfonic acid and, if appropriate, sulfuric acid and/or surfactant, subsequently percolates or trickles through the heaped-up material. Spraying of the metal-comprising compounds preferably occurs dropwise. After the metal or the desired anions have been separated off from the leachant, the latter is preferably used again for further extractions.

In a preferred embodiment, the metal-comprising compounds are firstly milled to give particles having a diameter of about 10 cm before leaching. The milled particles are then heaped up, usually to form heaps made up of from 100 000 to 500 000 metric tons of starting material. These are then extracted according to the process of the present invention.

It may be expressly pointed out that, according to the invention, the leachant can comprise varying concentrations of alkanesulfonic acid and, if appropriate, sulfuric acid and/or surfactant during the extraction process (gradient operation). Furthermore, part or all of the surfactants can be added to the starting material or rock before commencement of the extraction process, e.g. during milling of the material.

Depending on the starting material to be extracted, it can also be preferred for the starting material to be extracted to be firstly pretreated and wetted with a concentrated sulfuric acid and the starting material then to be washed with an excess of low-concentration sulfuric acid, as described in U.S. Pat. No. 4,120,935. In one embodiment of the invention, the metal-comprising compound can be pretreated with concentrated sulfuric acid and the desired anions or cations can then be extracted with an aqueous leachant comprising alkanesulfonic acid and, if appropriate, sulfuric acid and/or surfactant and/or a mixture of one or more salts of alkane sulfonic acids and sulfuric acid as well as, if appropriate, surfactant. Alkanesulfonic acid and/or surfactant and/or salt of alkanesulfonic acid can also be added to the concentrated sulfuric acid used for the pretreatment.

When a concentrated sulfuric acid is used for the pretreatment (wetting), its concentration is preferably from 25 to 500 g/l of $H_2SO_4$, particularly preferably from 50 to 400 g/l of $H_2SO_4$, in particular from 75 to 300 g/l of $H_2SO_4$.

According to the invention, the leachant used for the digestion may, if appropriate, comprise further additives for metal extraction which are known per se to those skilled in the art. An example is iron(III) ions for copper winning, preferably in a concentration of from 5 to 50 g/l, based on the composition according to the invention. The iron(III) ions are preferably used in the form of iron(III) sulfate in the composition according to the invention. Further suitable additives are, for example, additives which stabilize $Ca^{2+}$ ions which often occur in association with copper. Examples are sodium polyacrylates. Further suitable additives are aluminum ions.

The leaching of the metal-comprising starting material is generally continued until the content of extracted metal is less than 1 g/l. Depending on the type of material to be extracted and its amount, times of from 5 days to a number of months are usual for this to be achieved.

If copper is the metal to be recovered, a further suitable pretreatment for the copper-comprising starting material to be extracted according to the present invention is roasting. This is preferably effected by heating in roasting furnaces, for example rotary tube furnaces, multitier furnaces or fluidized-bed roasting furnaces, with admission of air. During roasting, sulfides, arsenides and antimonides of copper and associated metals are generally converted into the corresponding oxides.

In a preferred embodiment, the metal can be removed from the resulting aqueous mother liquor by extraction with a complexing agent soluble in organic media. For this purpose, it is possible to use, for example, organics-soluble complexing agents from Cognis (Lix® grades) and Cytec. Preference is given to 2-hydroxy-5-nonylacetophenone oxime, which is used in an organic solution (Shellsol®). The copper can subsequently be transferred from the organic solution, preferably by means of aqueous sulfuric acid, into an aqueous, preferably strongly acidic phase and isolated therefrom by electrochemical means. These procedures are known per se to those skilled in the art and are described, for example, in EP 0 536 914 A1.

In copper winning, the extracted copper can alternatively be precipitated from the mother liquor obtained in the process of the invention by means of scrap iron. This procedure, generally referred to as "cementation", is known per se to those skilled in the art. Cementation is usually followed by smelting of the copper obtained and electrolytic purification.

The process of the invention has a very wide range of uses. The following processes for obtaining various raw materials from the corresponding metal-comprising compounds may be mentioned by way of example.

About 80% of the zinc produced nowadays is electrolytic zinc. This is obtained by roasting of the zinc ores, (conversion of the zinc ores such as zinc blend and smithsonite into zinc oxide) followed by leaching with sulfuric acid and precipitation of more noble accompanying metals (Pb, Ni, Cd, Co, Ag etc.) by introduction of zinc dust. In an embodiment of the process of the invention, an aqueous solution of alkanesulfonic acid and, if appropriate, sulfuric acid and/or surfactant is used for leaching the roasted zinc ores.

The process of the invention can also be used in lanthanum recovery. The main raw material for the isolation of lanthanum is monazite sand. The digestion of this with sulfuric acid is followed by precipitation of lanthanum together with the other rare earth materials as oxalate; a combination of precipitation, ion exchange and extraction processes (lanthanide separation) leads to pure lanthanum solutions from which lanthanum(III) oxalate is precipitated, ignited to give lanthanum(III) oxide and the latter is either heated together with carbon in a stream of chlorine to form lanthanum(III) chloride or is converted into lanthanum(III) fluoride by reaction with hydrogen fluoride in a rotary tube furnace. The metal is finally obtained by melt electrolysis of lanthanum(III) chloride or reduction of lanthanum(III) fluoride with calcium/magnesium. In an embodiment of the process of the invention, the digestion of the monazite sand is carried out using an aqueous leachant which comprises alkanesulfonic acid and, if appropriate, sulfuric acid and/or surfactant.

The process of the invention can also be used in uranium recovery. To recover uranium, the ore is usually sorted according to the intensity of the radioactivity and milled. Uranyl sulfate ($UO_2SO_4$) is subsequently obtained by acid leaching. The acid processes also include bacterial leaching by means of Thiobacilllus ferrooxidans. The uranium is obtained from the resulting solutions by ion exchange processes or by extraction with organic solvents. The uranium is finally precipitated and dried to give marketable yellow cake (ammonium and/or magnesium diuranate). In an embodiment of the present invention, an aqueous leachant comprising alkanesulfonic acid and, if appropriate, sulfuric acid and/or surfactant can be used for the extraction of uranium from its ore.

The process of the invention can be used in the preparation of TiO$_2$, too. In the sulfate process, the metallic titanium slags which can be obtained from ilmenite (FeTiO$_3$) by reduction with coke are usually treated with concentrated sulfuric acid and the digestion cakes obtained here are dissolved in hot water or sodium hydroxide solution, resulting in precipitation of hydrated titanium dioxide which is calcined in rotary tube furnaces at 800-1000° C. to give finely particulate anatase or at >1000° C. to give coarsely particulate rutile. In an embodiment of the present invention, the metallic titanium slag is, in the production of TiO$_2$, treated with an aqueous leachant which comprises alkanesulfonic acid and, if appropriate, sulfuric acid and/or surfactant.

A further possible application of the process of the invention is the preparation of hydrogen fluoride. This is usually prepared by digestion of fluorspar (CaF$_2$) with concentrated sulfuric acid. In a further embodiment of the present invention, the digestion can be carried out by means of an aqueous leachant which comprises alkanesulfonic acid and, if desired, sulfuric acid and/or surfactant.

The process of the invention can accordingly be employed in the digestion of many metal-comprising compounds. Preference is given to using copper-comprising, TiO$_2$-comprising and CaF$_2$-comprising compounds as metal-comprising compounds to be digested. Particular preference is given to winning copper with the aid of the process of the invention.

The effectiveness of the present process will be demonstrated below for copper-comprising compounds.

EXAMPLES

Materials Used

Copper(II) sulfate 5-hydrate CuSO$_4$×5 H$_2$O, from Riedel-de-Haen
Copper(I) sulfide Cu$_2$S, from Aldrich
Copper(II) oxide CuO, from Riedel-de-Haen
Silica sand 0.2-0.5 mm, Schnaitenbach/Bayern
Composition of the Copper-Comprising Mixture

| Compound | Weight used [g] |
| --- | --- |
| Copper(II) sulfate 5-hydrate | 1 |
| Copper(I) sulfide | 1 |
| Copper(II) oxide | 1 |
| Silica sand | 500 |

Composition of the Acid Mixtures

| Experiment | E1 | E2 | E3 | E4 | E5 | E6 | E7 |
| --- | --- | --- | --- | --- | --- | --- | --- |
| 3% strength sulfuric acid [ml] | — | 10 | 20 | 30 | 35 | 39 | 40 |
| 3% strength MSA* [ml] | 40 | 30 | 20 | 10 | 5 | 1 | — |

*Methanesulfonic acid

Procedure

The copper-comprising mixtures are admixed at room temperature with the acid mixtures, stirred by means of a magnetic stirrer for 2.5 hours and allowed to stand overnight for 24 hours. The digestion mixture is then filtered with suction on a filter having a pore opening of 0.45 μm, the filtrate is made up to 250 ml with distilled water and the copper content of the solution is determined.

| Experiment | E1 | E2 | E3 | E4 | E5 | E6 | E7 |
| --- | --- | --- | --- | --- | --- | --- | --- |
| 3% strength sulfuric acid [ml] | — | 10 | 20 | 30 | 35 | 39 | 40 |
| 3% strength MSA [ml] | 40 | 30 | 20 | 10 | 5 | 1 | — |
| Cu in [g/100 g] | 0.058 | 0.059 | 0.065 | 0.075 | 0.086 | 0.11 | 0.057 |

The invention claimed is:

1. A process comprising:
   providing a metal-containing compound; and
   subjecting the metal-containing compound to an acid digestion comprising contacting the metal-containing compound with an aqueous leachant;
   wherein the aqueous leachant comprises a mixture of:
      sulfuric acid and one or more alkanesulfonic acids having alkane moieties selected from the group consisting of propyl, ethyl and methyl groups, at a weight ratio of alkanesulfonic acid to sulfuric acid of 1:39 to 1:1.

2. The process according to claim 1, wherein the concentration of the sulfuric acid is 0.1 to 50% by weight.

3. The process according to claim 1, wherein the concentration of the one or more alkanesulfonic acids is 0.001 to 50% by weight.

4. The process according to claim 1, wherein the alkanesulfonic acid comprises methanesulfonic acid.

5. The process according to claim 1, wherein the leachant further comprises one or more surfactants selected from the group consisting of nonionics, anionics, cationics, amphoterics and mixtures thereof.

6. The process according to claim 5, wherein the surfactant is present at a concentration of 0.01 to 0.3% by weight, such that a reduction in the contact angle on glass by at least 10° after 1 second in 2% strength aqueous H$_2$SO$_4$ solution at 23° C. is provided.

7. The process according to claim 5, wherein the surfactant is present at a concentration of 0.05 to 0.25% by weight, providing for a reduction in the contact angle on glass by at least 20° after 0.5 second in 2% strength aqueous H$_2$SO$_4$ solution at 23° C.

8. A copper-winning process comprising the process according to claim 7.

9. The process according to claim 1, wherein the metal-containing compound comprises a metal component selected from the group consisting of copper, titanium, CaF$_2$, zinc, lead, molybdenum, antimony, bismuth, mercury, cobalt, nickel, aluminium, lanthanum, lanthanides, uranium or a combination thereof.

10. The process according to claim 9, wherein the metal-containing compound comprises a metal component selected from the group consisting of copper, zinc, lanthanum, lanthanides, uranium and combinations thereof.

11. The process according to claim 9, wherein the metal-containing compound comprises a metal component selected from the group consisting of copper, titanium, CaF$_2$ and combinations thereof.

12. The process according to claim 1, wherein the metal-containing compound comprises a metal component selected from the group consisting of copper, titanium, CaF$_2$, and combinations thereof.

13. A copper-winning process comprising the process according to claim 1.

14. The process of claim 1, wherein the metal-containing compound comprises copper.

15. The process of claim 1, wherein the metal-containing compound comprises a metal component selected from the group consisting of titanium, $CaF_2$, zinc, lead, molybdenum, antimony, bismuth, mercury, cobalt, nickel, aluminium, lanthanum, lanthanides, uranium or a combination thereof.

16. The process of claim 1, wherein the metal-containing compound comprises $TiO_2$ or $CaF_2$.

* * * * *